United States Patent [19]

Sheldon

[11] 4,253,238

[45] Mar. 3, 1981

[54] FILAMENT TYPE TRIMMER

[75] Inventor: John D. Sheldon, Charlotte, N.C.

[73] Assignee: Textron, Inc., Providence, R.I.

[21] Appl. No.: 110,896

[22] Filed: Jan. 10, 1980

Related U.S. Application Data

[63] Continuation-in-part of Ser. No. 929,036, Jul. 28, 1978, abandoned.

[51] Int. Cl.³ .................................................. A01D 50/00
[52] U.S. Cl. ......................................... 30/276; 56/12.7
[58] Field of Search .................... 30/276, 347; 56/12.7, 56/295; 51/335

[56] References Cited

U.S. PATENT DOCUMENTS

| | | | |
|---|---|---|---|
| 2,533,619 | 12/1950 | Pokras | 51/335 |
| 4,054,992 | 10/1977 | Ballas et al. | 30/276 |
| 4,062,114 | 12/1977 | Luick | 30/276 |
| 4,134,204 | 1/1979 | Perdue | 30/276 |
| 4,169,311 | 10/1979 | Evenson et al. | 30/276 |

Primary Examiner—Jimmy C. Peters
Attorney, Agent, or Firm—Robert E. Burns; Emmanuel J. Lobato; Bruce L. Adams

[57] ABSTRACT

In a filament type trimmer a filament is wound on a storage spool in a rotating housing and exits through an opening in a rim portion of the housing. When the extending portion of the filament is rotating freely, it extends approximately radially from the housing. However, when it hits a relatively stationary object, it is deflected rearwardly so as to extend approximately tangentially from the housing. To avoid high stresses in the exiting portion of the filament, the exit opening is inclined rearwardly so that when the filament is deflected rearwardly by striking an object, it extends in a tangential line off of the spool, thereby avoiding bending stresses at the exit opening.

10 Claims, 8 Drawing Figures

2

FILAMENT TYPE TRIMMER

REFERENCE TO PRIOR APPLICATION

This application is a continuation-in-part of my application Ser. No. 929,036 filed July 28, 1978 now abandoned.

FIELD OF INVENTION

The present invention relates to filament type trimmers and in particular to means for avoiding breakage of the filament where the filament exits from the cutting head.

BACKGROUND OF THE INVENTION

In a filament type trimmer having a filament storage spool mounted in a rotating housing having a rim portion with an exit aperture through which the filament extends, frequent breakage of the filament has been found to occur where the filament exits from the cutting head. It has been determined that the exit aperture has no effect on filament breakage so long as the filament is rotating in free air and does not strike any relatively stationary object. Thus any suitable means for allowing the string to pass through the outer wall of the housing is suitable under these conditions. However, when the cutting filament hits a relatively stationary object, the filament is deflected rearwardly and a component of the impact load is transmitted along the filament. This tensile load causes the filament to stretch and, moreover, applies a high localized load where the filament bends at the exit aperture.

It has been proposed to support the filament by a substantially curvilinear bearing surface at the exit aperture and to form the bearing surface of a material having a low coefficient of friction with respect to the filament. While these expedients have been found to be somewhat beneficial in reducing filament breakage, it has been found that they do not provide a complete solution to the problem.

SUMMARY OF THE INVENTION

It is an object of the present invention to overcome these problems and difficulties in a simple yet highly effective manner. In accordance with the invention the rim portion of the cutting head is provided with a filament exit opening which is generally cylindrical with an axis that lies in the cutting plane, i.e. a plane perpendicular to the axis of rotating of the cutting head, and is inclined rearwardly at an acute angle to a radial line drawn from the axis of the cutting head to the exit aperture. Hence when the filament impacts an object and is thereby deflected rearwardly, the filament extends freely through the exit aperture in a substantially tangential line off of the storage spool and is hence not bent at the exit aperture. The axial load in the filament is taken in pure tension and the filament is not caused to bend around a supporting surface at the exit. The diameter of the cylindrical exit is of a size to compensate for the different coil radii caused by a full or empty storage spool.

BRIEF DESCRIPTION OF DRAWINGS

The nature, objects and advantages of the invention will be more fully understood from the following description of a preferred embodiment shown by way of example in the accompanying drawings in which.

DESCRIPTION OF PREFERRED EMBODIMENT

Figure 3:
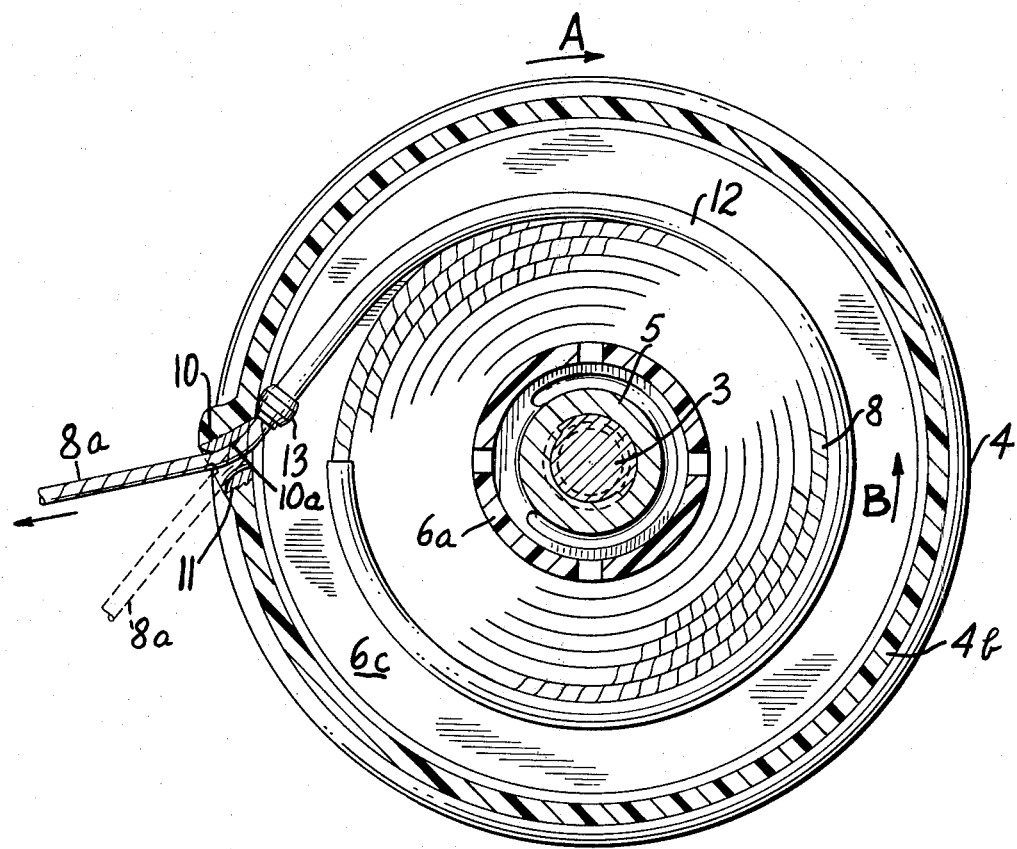
FIG. 3 is a horizontal section taken approximately on the line 3—3 in FIG. 1.

A filament type trimmer in accordance with the present invention is illustrated by way of example in the drawings as comprising a rotary cutting head 1 driven in the direction indicated by the arrow A in FIG. 3 by a motor 2 shown schematically by way of example as a single cylinder two-stroke cycle internal combustion engine having a drive shaft 3. The cutting head 1 is shown as comprising a circular housing 4 having a base portion 4a and downwardly extending annular wall comprising a rim portion 4b. The housing is conveniently molded of plastic material and is removably secured to the motor by an internally threaded metal bushing 5 which is screwed onto a threaded portion of the motor drive shaft 3. A filament storage spool 6 having a hub portion 6a and opposite flange portions 6b and 6c is rotatably mounted coaxially in the housing so as to rotate relative to the housing in the direction indicated by the arrow B to feed out additional filament from time-to-time. The spool 6 is retained by a removable cap 7 having internally threaded central hub portion which screws onto a threaded end portion of the bushing 5.

Figure 1:
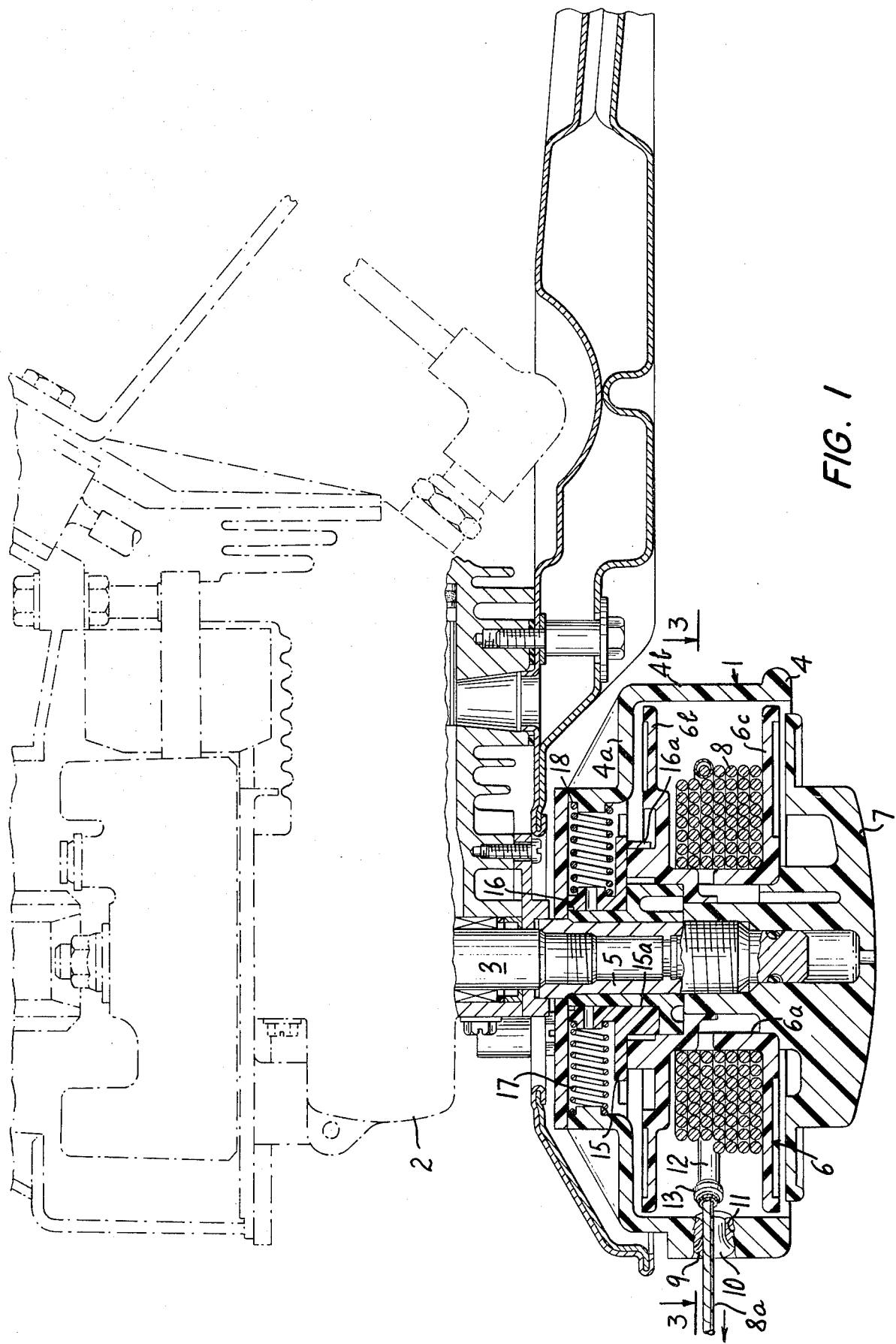
FIG. 1 is a vertical sectional view through the rotating housing and adjacent portion of a filament type trimmer in accordance with the present invention, the motor by which the housing is rotating being shown schematically in phantom.

A filament 8 is wound on the spool 6 in a direction opposite to the direction rotation of the head 1 and an inner end of the filament is secured to the hub portion of the spool. The filament 8 is, for example, a monofilament of thermoplastic material selected for the characteristics of strength, toughness and abrasion resistance. An outer end portion 8a of the filament extends approximately tangentially from the spool 6 to and passes freely out through an exit opening 9 provided in the rim portion 4b of the rotating housing 4. The exit opening 9 is shown as comprising a bushing 10 set in an opening 11 in the rim portion 4b of the rotating housing 4. The bushing 10 is of hard abrasion resistant material having a low coefficient of friction with respect to the filament 9. For example the bushing 10 may be of metal such as brass or stainless steel or it may be a hard abrasion resistant plastic. It is set firmly in the opening 11 in the rim portion of the housing, for example by ultrasonic welding. As seen in FIG. 1, the bushing 10 is set with its axis in the cutting plate, i.e. a plane perpendicular to the axis of rotation of the cutting head 4 while, as seen in FIG. 3, the axis of the bushing 10 is inclined rearwardly with respect to a radius of the housing 4 which passes through the bushing so as to be approximately aligned with the filament extending tangentially from the spool 6 to the opening. The angle of inclination to the radius is, for example 30°–45°. When running free, the filament extends approximately radially from the housing as shown in solid lines in FIG. 3 and bears on the front of the bushing 10 which has a smooth rounded surface 10a so as to reduce friction with the filament. The front bearing surface 10a curves smoothly from an inner portion, which is approximately aligned with the portion of the filament extending tangentially from the spool to the exit opening, to an outer portion which is approximately radial of the housing. When the filament strikes an obstacle, it is deflected rearwardly so as to extend approximately tangentially from the spool and straight to and through the exit opening 9 without bearing on the bushing as illustrated in dotted lines. Hence the impact load on the filament is taken in pure tension and the combination of tension and bending at the exit opening is avoided. The bushing 10 has an internal diameter of a size to compensate for different coil radii by a full, empty or partially empty stool.

Figure 2:
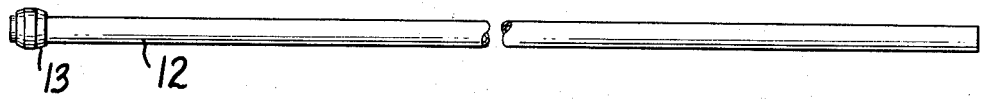
FIG. 2 is a side view of a guide tube for the filament before the tube is bent.

In accordance with the invention disclosed in application Ser. No. 929,026 filed July 28, 1978, a portion 8b of the filament which extends from the spool to the exit opening 9 passes through a guide tube 12. The tube 12 is for example a tube of dead-soft aluminum which is originally a straight piece of tubing as shown in FIG. 2. The tubing has an internal diameter slightly larger than the diameter of the filament 8 so that the filament can be readily threaded through it. Before the spool 6 with the filament wound thereon is placed in the housing 4, an outer end portion of the filament is threaded through the tube 12 and the tube is thereupon bent in the form shown in FIG. 3 so that it is wrapped partially around the spool and extends tangentially from the spool to the exit opening 9 when the spool is placed in the housing. Preferably the guide tube 12 is of such length that with a full spool it wraps approximately once around the spool as illustrated in FIG. 3. The outer end of the guide tube 12 is enlarged for example by fixing thereon a ferrule 13 so that it cannot pass out through the exit opening in the rim portion of the rotating housing. The guide tube 12 is sufficiently flexible that as the filament is used-up, the pull of centrifugal force on the filament is sufficient to bend the tube and make it conform substantially to the outer coils of filament on the spool except for the tangential portion that extends to the exit opening 9. It has been found that the guide tube 12 avoids frictional rubbing of the outermost coil of filament on the spool with adjacent coils and thereby avoids melting of the filament and welding of the filament to itself. Moreover, as the guide tube hugs the spool, it prevents entanglement of one coil of filament with another.

Instead of being formed of soft aluminum tubing, the guide tube 12 may be of other material which provides appropriate flexibility. For example the tubing may be formed of coiled wire with closely positioned successive convolutions. Instead of being seamless, the tubing may be split along its outer periphery to facilitate the threading of the filament through it. The heat conductivity of the tube contributes to avoiding welding.

The spool 6 is normally locked with respect to the housing 4 so as to rotate with the housing. However, means is provided for releasing the spool from time-to-time to permit a portion of the filament to be unwound from it by the pull of centrifugal force on the outer end portion 8a of the filament. In the embodiment illustrated by way of example in FIG. 1, rotation of the filament spool 6 relative to the housing 4 is controlled by mechanism such as that disclosed in John D. Sheldon U.S. Pat. No. 4,104,796.

As illustrated in FIG. 1, this mechanism comprises a low speed slider 15 and a high speed slider 16. The sliders 15 and 16 are slidable in radially extending slots in the base portion 4a of the housing 4 immediately above the filament spool 6. The sliders 15 and 16 are biased radially inwardly by coil springs 17 and 18 respectively. By reason of rotation of the housing 4 at high speed, centrifugal force acts on the sliders 15 and 16 so as to move them radially outwardly against the bias of the respective springs at predetermined speeds of rotation. The springs 17 and 18 are calibrated with respect to the weights of the respective sliders so as to determine the rotational speed of the housing at which the sliders move outwardly by centrifugal force. The spring 18 of the slider 16 is stronger relative to the weight of the slider than the spring 17 of the slider 15 so that the low speed slider 15 will move radially outwardly at a lower speed that the high speed slider 16.

The low speed slider 15 is provided with a downwardly extending projection 15a which in the outer position of the slider is engageable with one or another of upwardly extending projections 19 provided on the upper flange 6b of the filament spool 6. The projections 19 are arranged in a circle concentric with the axis of the spool and are spaced circumferentially. For example three or four such projections may be provided on the spool. The high speed slider 16 is similarly provided with a downwardly extending projection 16a which in the inner position of the slider is engageable with one another of the projections 19 on the spool. By way of example the springs 17 or 18 are calibrated so that when the cutting head 1 is rotating at a speed below 3000 rpm both sliders are in their inner position, at 3000 to 9000 rpm the lower speed slider 15 has moved to its outer position while the high speed slider 16 is still in its inner position and above 9000 rpm both sliders are in their outer position. It will be understood that different speeds can be selected by suitable calibration of the springs with respect to the weights of the sliders. When the cutting head 1 is rotating at a normal operating speed, for example within the range of 3000 to 9000 rpm, the projection 16a of the high speed slider 16 engages one of the projections 19 on the filament spool so as to hold the spool against rotation relative to the casing. If the speed of rotation of the cutting head 1 increases above 9000 rpm (by reason of the projecting end portion 8a of the filament having become shorter and thereby reducing the load on the motor 2) the high speed slider 16 moves outwardly against the bias of its spring so as to disengage the respective projection 19 on the spool, thereby permitting the spool to be rotated by the pull of centrifugal force on the filament so as to unwind filament from the spool. However, the projection 15a of the low speed slider is in the path of travel of the projections 19 on the spool 6 so that the spool is permitted to rotate only until another of the projections on the spool engages the projection 15a of the low speed slider 15. Further rotation of the filament spool relative to the cutting head is delayed until, for example by manual control of the motor, the speed of rotation of the cutting head is reduced to a speed below 3000 rpm idling speed. Both of the sliders 15 and 16 are thereupon moved to their inner positions by the bias of the respective springs whereupon the projection 15a of the low speed slider is disengaged from the respective projection on the spool thereby permitting the spool to rotate until the next projection on the spool engages the projection 16a of the high speed slider 16. This delay in feeding additional filament avoids sudden increase in the length of the filament and corresponding increase in the cutting radius of the trimmer while the cutting head is rotating at high speed. Hence, if the user is trimming close to a flower bed, possible damage to the flowers is avoided. As a trimmer of this kind is usually operated for only short periods of time between idling periods, the cycle of operation described above for restoring the normal length of the projecting end portion of the filament occurs automatically and without any special attention on the part of the operator.

A somewhat modified embodiment of the invention is illustrated in FIGS. 4–8 in which corresponding parts are designated by the same reference numerals with the addition of 20. As in the embodiment illustrated in FIGS. 1–3, the trimmer has a cutting head comprising a circular housing 24 mounted on the drive shaft 23. The housing 24 has a circular base portion 24a and a downwardly extending annular wall at the periphery of the base portion forming a rim portion 24b. The housing 24 is rotatable in the direction indicated by the arrow A in FIG. 4. A filament storage spool 26 is rotatably mounted coaxially in the housing so as to be rotatable relative to the housing in the direction indicated by the arrow B to feed out additional filament from time-to-time. The filament 28 is wound on the spool 26 in a direction opposite to the direction of rotation of the head 1 and an inner end of filament is secured to the hub portion of the spool. An outer end portion 28a of the filament extends approximately tangentially from the spool 6 to and passes freely out through an exit opening 29 provided by a bushing 30 set in an opening 31 in the rim portion 24b of the housing. As in the embodiment illustrated in FIGS. 1–3, the bushing 30 is of hard abrasion resistant material having a low coefficient of friction with respect to the filament 28 and firmly set in the opening 31 in the downwardly extending rim portion of the molded plastic housing.

Also as described with reference to FIG. 3, the portion of the filament which extends from the spool to the exit opening 29 passes through a guide tube 32 of easily bendable material such as dead-soft aluminum. The guide tube 32 is provided at its inner end with a ferrule 33 and at its outer end with a tubular collar 34. The ferrule 33 is relatively short and tapered at both ends while the collar 34 is longer and is cylindrical. The ferrule 33 and collar 34 are formed of harder material than the guide tube 32, for example of brass or stainless steel.

Figure 4:
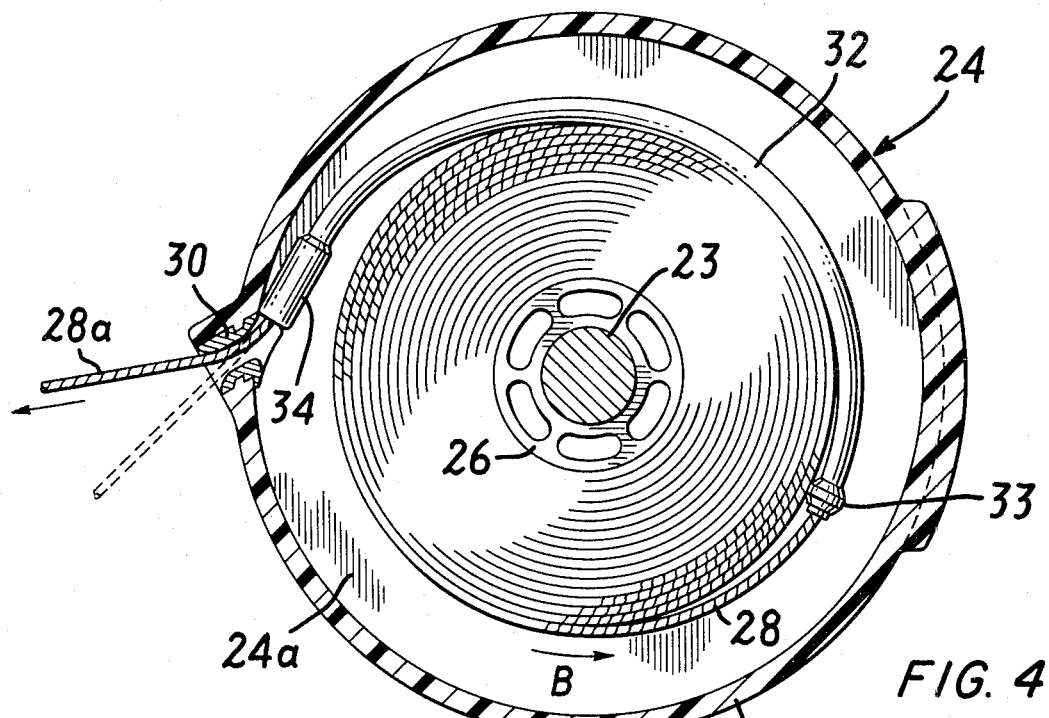
FIG. 4 is a horizontal section similar to FIG. 3 but showing a modification.
Figure 5:
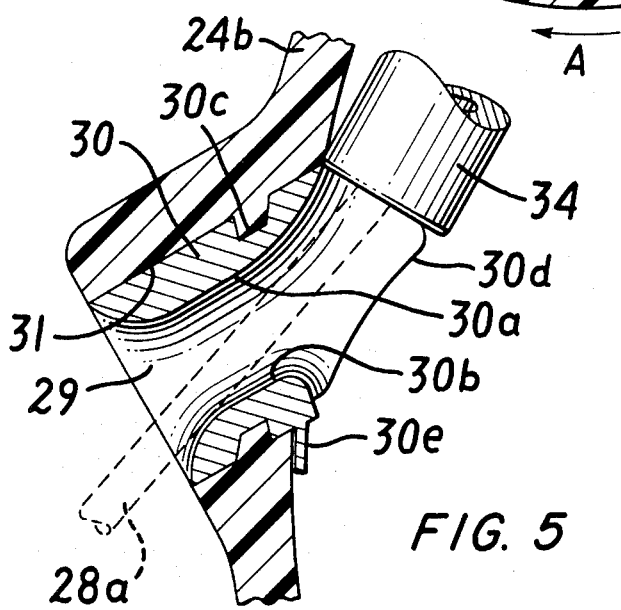
FIG. 5 is an enlargement of a portion of FIG. 4 showing in more detail a bushing which forms the exit opening for the filament.
Figure 7:
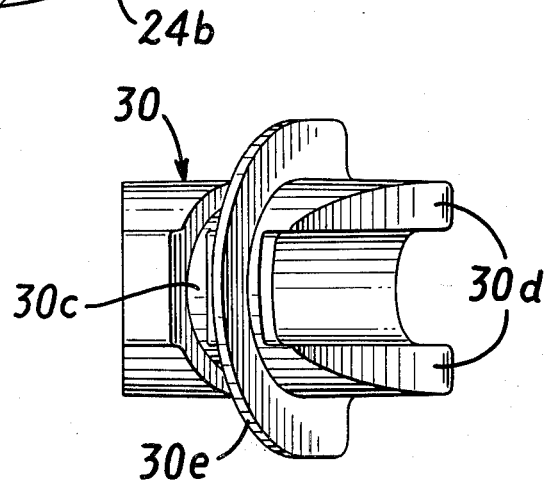
FIG. 7 is a bottom view of the bushing shown in FIG. 6.
Figure 6:
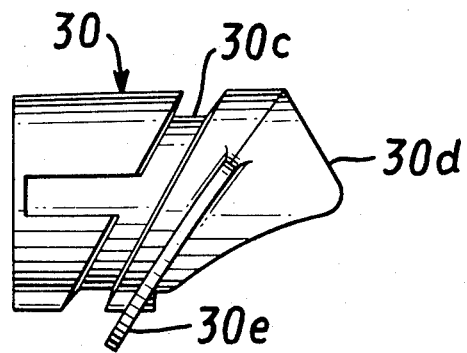
FIG. 6 is a side view of the bushing removed from the rim portion of the housing.
Figure 8:
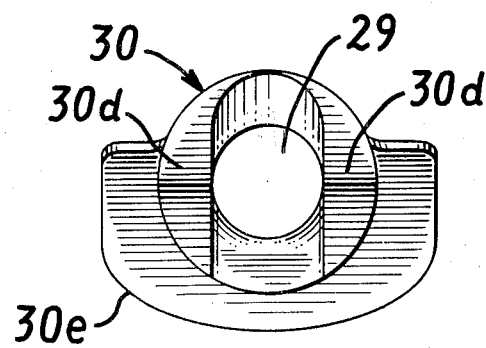
FIG. 8 is an end view of the bushing looking at the inner end approximately in line with the axis of the filament opening.

As seen in FIG. 4, the bushing 30 is set in the rim portion 24b of the housing so that the axis of the bushing is inclined rearwardly with respect to a radius of the housing which passes through the bushing so as to be approximately aligned with the portion of filament extending tangentially from the spool 26 to the exit opening. The angle of inclination to the radius is for example about 30°–45°. When running free, the filament 28 extends approximately radially from the housing as shown in solid lines in FIG. 4 and bears on the front surface 30a of the bushing which is rounded so as to reduce friction with the filament. As seen in FIGS. 4 and 5, the front bearing surface 30a of the bushing curves smoothly from an inner portion which is approximately aligned with the portion of the filament extending tangentially from the spool to the exit opening to an outer portion which is approximately radial of the housing. When the extending end portion 28a of the filament strikes an obstacle, it is deflected rearwardly as illustrated in dotted lines in FIGS. 4 and 5 so as to extend approximately tangentially from the spool and straight to and through the exit opening 29 without bearing on the bushing. Hence, the impact load on the filament is taken in pure tension and stress exerted by a combination of tension and bending of the exit opening is avoided.

The rear surface 30b of the opening in the bushing 30 is also rounded and is considerably shorter in an axial direction than the front surface 30a. On its outer surface the bushing has a circumferential groove 30c for anchoring the bushing securely in the opening 31 in the rim of the housing. At its inner end the bushing 30 has opposite wing portions 30d having end surfaces which are engaged by the end of the collar 34 on the guide tube 32 so as to support the guide tube and prevent the end of the tube from entering the exit opening 29 in the bushing 30. Hence, when the extending end 28a of the filament 28 is running free as shown in solid lines in FIG. 4, it passes out of the guide tube 32 and curves smoothly around the front bearing surface 30a of the bushing. When the extending end of the filament strikes an obstacle, it extends from the end of the guide tube straight through the opening 29 of bushing 30 as illustrated in dotted lines in FIGS. 4 and 5 so that force exerted on the filament is taken in pure tension. The bushing 30 further has a skirt portion 30e which seats on the inner surface of the rim portion 24b of the housing to assist in position the bushing 30.

The ferrule 33 on the inner end of the guide tube 32 provides a smooth ball-like end on the guide tube and assists in separating the filament from underlying convolutions as the filament is drawn into the guide tube. As seen in FIG. 4 the rim portion of the housing is provided at a location opposite the bushing 30 with a thicker portion 24c which serves as a counter weight for balancing the housing. Except as otherwise shown and described, the embodiment of FIGS. 4 to 8 is like that of FIGS. 1 to 3.

As the exit opening provided in accordance with the present invention avoids the deliterious effect of combined axial load, bending and friction at the exit opening when the filament strikes a relatively stationary object, the filament breakage which has heretofore been experienced is avoided. Filament life is thereby greatly increased.

While a preferred embodiment of the invention is illustrated in the drawings and has been herein described, it will be understood that variations and modifications may be made and that the invention is hence in no way limited to the illustrated embodiment.

I claim:

1. In a filament type trimmer, the combination of a rotatable housing having a rim portion, means for driving said housing in a selected direction of rotation, a filament storage spool rotatably mounted in said housing, a filament wound on said spool, exit means in said rim portion of the housing through which said filament extends in passing from said spool to the exterior of the housing, an end portion of said filament extending beyond said housing rim portion and constituting a cutting means of said trimmer, said exit means comprising a bushing having an aperture through which said filament extends, a flexible guide tube which wraps at least partially around said filament wound on said storage spool and extends tangentially to said bushing, said filament passing through said guide tube in going from said storage spool to said exit means, said aperture in said bushing having a central axis which is approximately aligned with an adjacent portion of said guide tube and having a smoothly curved front bearing surface, whereby said extending end portion of the filament when running free extends approximately radially from said housing so that said filament bears on and bends around said curved front bearing surface of said aperture, and when said extending end portion of the filament strikes an obstacle, it is deflected rearwardly relative to the housing so that said filament extends tangentially from said storage spool, through said guide tube and through said aperture in a substantial straight line free of flexing by engagement with said bushing.

2. The combination according to claim 1, in which the axis of said aperture of said bushing is disposed at an angle of 30° to 45° to a radius of said housing passing through said bushing.

3. The combination according to claim 2, in which said housing is of molded plastic material and said bushing is of hard, wear resistant low friction material set in said rim portion of said housing.

4. The combination according to claim 3, in which said bushing is ultrasonically welded to said rim portion of said housing.

5. The combination according to claim 1, in which a ferrule is fixed on the end of said guide tube adjacent said bushing to prevent said guide tube passing out through said aperture in said bushing.

6. The combination according to claim 1, in which said curved front bearing surface of said aperture of said bushing has an inner portion approximately aligned with an adjacent end portion of said guide tube, an outer portion approximately radial of said housing and a smoothly curved intermediate portion joining said inner portion with said outer portion.

7. The combination according to claim 6, in which said aperture of said bushing has a curved rear surface of shorter length than said curved front surface.

8. The combination according to claim 1, in which a collar is provided on the outer end of said guide tube and in which said bushing has inwardly extending portions on which said collar seats to prevent said guide tube from entering said aperture of said bushing.

9. In a filament type trimmer, the combination of a rotatable housing comprising a circular base portion having at its periphery a downwardly extending annular wall comprising a rim portion, means for driving said housing in a selected direction of rotation, a filament storage spool rotatably mounted centrally in said housing, a filament wound on said spool in a direction opposite to the direction of rotation of said housing, a bushing of hard, low-friction material set in an opening extending through said rim portion of the housing, said bushing having an exit opening through which said filament extending tangentially from said spool freely passes to the exterior of said housing, an end portion of said filament extending beyond said housing rim portion and constituting a cutting means of said trimmer, said exit opening having a smoothly curved front bearing surface and a central axis which lies in a plane perpendicular to the axis of rotation of said housing and is inclined rearwardly with respect to a radius of said housing passing through said exit opening so as to be approximately in line with the filament extending tangentially from said spool to said exit opening, whereby said extending end portion of the filament when running free extends approximately radially from said housing so that said filament bears on and bends around said curved front bearing surface of said exit opening, and when said extending end portion of the filament strikes an obstacle, it is deflected rearwardly relative to the housing so that said filament extends tangentially from said storage spool to and through said exit opening in a substantially straight line free of flexing in passing through said exit opening.

10. A combination according to claim 9, in which the axis of said filament exit opening in said bushing is inclined at an angle of about 30°–45° to a radius of said housing passing through said bushing.

* * * * *